United States Patent [19]

Bracke

[11] 4,263,420
[45] Apr. 21, 1981

[54] PROCESS FOR PREPARING STYRENIC RESINS

[75] Inventor: William J. I. Bracke, Hamme, Belgium

[73] Assignee: Labofina, S. A., Brussels, Belgium

[21] Appl. No.: 24,837

[22] Filed: Mar. 28, 1979

Related U.S. Application Data

[63] Continuation-in-part of Ser. No. 916,576, Jun. 19, 1978, abandoned, which is a continuation-in-part of Ser. No. 890,211, Mar. 27, 1978, abandoned.

[51] Int. Cl.$^3$ ............................................. C08F 257/02
[52] U.S. Cl. .................................... 525/309; 525/305; 525/307; 525/312; 525/315; 525/316
[58] Field of Search ............... 525/305, 307, 309, 312, 525/315, 316, 330, 332, 334

[56] References Cited

U.S. PATENT DOCUMENTS

| | | | |
|---|---|---|---|
| 2,994,683 | 8/1961 | Calvert | 260/879 |
| 3,047,533 | 7/1962 | Calvert | 260/879 |
| 3,793,402 | 2/1974 | Owens | 260/876 R |
| 3,845,164 | 10/1974 | Goto et al. | 260/876 R |
| 3,971,835 | 7/1976 | Myers et al. | 260/876 R |
| 3,998,910 | 12/1976 | Hrabak et al. | 260/876 R |

Primary Examiner—Stanford M. Levin

[57] ABSTRACT

A process for preparing styrenic resins is disclosed which comprises the steps of:

(a) adding monomer material selected from the group consisting of monomers and monomer mixtures being capable of forming a rubbery polymer by polymerization and preferably comprising an acrylic acid ester to a polymeric matrix comprising a polymer of a styrenic compound;

(b) contacting the polymeric matrix and the monomer material under conditions in which said monomer is absorbed by said polymeric matrix; and (c) polymerizing said monomer material with formation of a rubbery polymer partly grafted on the polymeric matrix.

The resulting styrenic resin exhibits good impact strength and gloss.

36 Claims, 3 Drawing Figures

PROCESS FOR PREPARING STYRENIC RESINS

CROSS-REFERENCE TO RELATED APPLICATIONS

The present application is a continuation-in-part of application Ser. No. 916,576 filed on June 19, 1978, abandoned, which is a continuation-in-part of application Ser. No. 890,211 filed on Mar. 27, 1978, abandoned.

BACKGROUND OF THE INVENTION

The present invention relates to a new process for preparing rubber reinforced styrenic resins, in particular ASA resins, which are copolymers of styrene, unsaturated nitriles, acrylates and conjugated dienes.

It is well known that styrene homopolymers and copolymers of styrene and unsaturated nitriles have a poor impact strength. In order to increase this impact strength, rubber is added to these styrene polymers. The principal methods which have been used are: blending of a rubber latex with a polystyrene latex, milling of a dry rubber with a dry polystyrene, or polymerization of styrene in the presence of an unsaturated rubber. This latter method is the most widely employed, as the products obtained are more stable and have superior properties when compared with products prepared with the other methods, based upon the same amount of contained rubber. The generally used rubbery polymers are conjugated diene polymers and/or acrylic rubbers. The resulting styrenic resins are usually called impact polystyrene, ABS resins or ASA resins, according to their composition.

One of the usual techniques for preparing rubber-reinforced styrenic resins consists in preparing the rubbery compound, in a first-step, by emulsion polymerization of a monomer, such as for instance, a diolefin or a mixture of an aliphatic ester of acrylic acid with a low amount of a difunctional monomer, to obtain a latex containing cross-linked particles of rubber. In a second step, chains of homo-or copolymers of styrene are grafted onto the particles of the pre-formed rubber in order to obtain a sufficient degree of dispersion together with a good adhesion of the rubber phase in the continuous phase comprised of the styrene homo- or copolymers. In a third step, the grafted latex is coagulated and dried.

However, this method presents several drawbacks. For instance, the end product always contains a substantial amount of emulsifier which has a detrimental effect on the properties of the desired product. Another method comprising a mass prepolymerization of styrene in the presence of a rubber followed by a suspension polymerization gives products having high impact resistance and also better properties than similar products obtained by an all emulsion process or by an all suspension process. With this two-step method, the monomer to be grafted on the rubber must be a solvent for this rubber. At the beginning, the mixture of rubber and monomer, for instance styrene, forms a homogeneous phase, which is subjected to a partial mass polymerization step, under vigorous agitation. A polystyrene phase separates from the solution, and the polymerization system thus comprises two phases: a continuous phase consisting of rubber dissolved in styrene and a discontinuous phase consisting of polystyrene in styrene. Concomitant with the formation of polystyrene, graft copolymers are also produced. After reaching a certain point in conversion of the monomer, a phase inversion occurs and the polymerization is continued by suspension polymerization. The rubber-in-styrene phase is now the discontinuous phase suspended in a matrix of polystyrene dissolved in styrene. Vigorous stirring is required during the mass prepolymerization in order to control the sizes of the rubber particles which must be comprised between about 1 and 5 82 m. Other factors also play a role in this process, and in some cases the viscosity of the system after the mass prepolymerization step is so high that it is not possible to obtain a suspension of the copolymer. This process must be carefully carried out, and it therefore has some limitations.

In order to obviate the drawbacks of the hereinabove described processes, it has already been proposed to graft butadiene on a previously irradiated styrenic compound-acrylonitrile compound copolymer, by dispersing the copolymer in a solution of hexane and butadiene in order to induce an absorption of butadiene by the copolymer. However, this process results in a low degree of grafting, and it is necessary to remove the unreacted butadiene. Moreover, the impact strength of these copolymers is lower than that generally required for such compositions.

It has also been proposed to use sequentially produced polymers as additives to other rigid thermoplastics. The process for manufacturing these additives comprises at least three stages. It comprises first forming a non-rubbery, hard polymer core by emulsion polymerization of a first monomer charge, particularly styrene. In a second stage, a second monomer charge containing butadiene and/or an alkyl acrylate is added to the hard polymer core and is emulsion polymerized with formation of a rubbery polymer stage. Thereafter, a third monomer charge containing an alkyl methacrylate is added to the rubbery polymer and is emulsion polymerized to form a third stage polymer substantially encapsulating the polymer produced in steps 1 and 2. In this composite, the hard phase polymeric methacrylate comprises a cover or layer for the inner mass and imparts compatibility to the composite with the rigid thermoplastic polymer. The inner mass comprises a rubber polymer which forms a continuous phase and which is grafted onto the styrene polymer. The sequentially produced polymer is an elastomeric material which imparts improved impact resistance and clarity to vinyl halide polymer compositions and other rigid thermoplastic polymers. See, for example, U.S. Pat. Nos. 3,793,402 and 3,971,835. It acts therefore as impact improver and is quite different from a rubber-modified polystyrene, wherein the rubber acts as impact improver for the polystyrene.

The exact mechanism by which discrete particles of rubber increase the impact strength of glassy polystyrene is still controversial. However, it has been shown that the rubber is particularly effective when it is present during the polymerization of styrene. Grafting of styrene to rubber takes place and occlusion of polystyrene extends the volume fraction of the dispersed rubber phase.

SUMMARY OF THE INVENTION

It is an object of the present invention to provide a new process for preparing impact styrenic resins, wherein the rubber particles are formed in situ in the presence of rigid styrenic resins.

It is another object of the present invention to provide a new process for preparing impact styrenic resins which allows the drawbacks of the known processes to be overcome.

A further object of the present invention is to provide a new process for producing compositions comprising a rigid polymer of a styrenic compound and a rubbery material acting as impact improver, said rubbery material being partly grafted to the rigid polymer.

It is also an object of the present invention to provide a new process for producing impact styrenic resins which are substantially gel free.

In order to accomplish the foregoing objects according to the present invention, there is provided a process for preparing rubber-modified styrenic resins which comprises the steps of (a) adding a monomer material selected from the group consisting of monomers and monomer mixtures, being capable of forming a rubbery polymer by polymerization, to a rigid polymeric matrix (substantially free from reactive sites) comprising a polymer of a styrenic compound;

(b) contacting the rigid polymeric matrix and the monomer material under conditions in which said monomer material is absorbed by said polymeric matrix;

(c) suspension polymerizing said monomer material in the presence of a free-radical catalyst with formation of a rubbery polymer partly grafted to the polymeric matrix; and (d) recovering beads of rubber-modified styrenic resins which are substantially gel-free.

The monomer material being capable of forming a rubbery polymer preferably comprises an ester of acrylic acid.

Further objects, features and advantages of the present invention will become apparent from the detailed description of the invention and its preferred embodiments which follow.

DETAILED DESCRIPTION OF THE INVENTION AND ITS PREFERRED EMBODIMENTS

Figure 1:
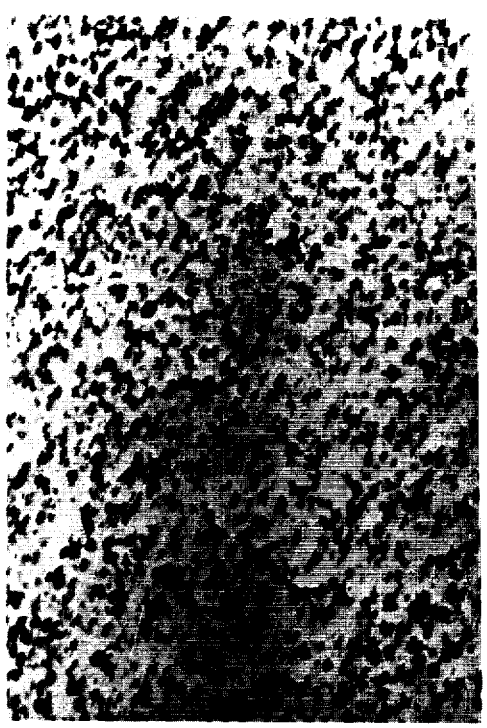
FIG. 1 is an electron-microscope photograph of an ASA polymer according to the present invention.

The process of the present invention for preparing styrenic resins, consists essentially in adding a monomer or a monomer mixture, which is capable of forming a rubbery polymer by polymerization, to a polymeric matrix essentially consisting of a homopolymer of a styrenic compound or a copolymer of a styrenic compound and an acrylic compound, contacting the polymeric matrix and the monomer or monomer mixture under conditions in which the monomer or monomer mixture is absorbed by the polymeric matrix, and polymerizing the monomer or monomer mixture with formation of a rubbery polymer or copolymer partly grafted on the polymeric matrix.

The styrenic compound which is most often used for preparing the polymeric matrix is styrene, yet styrene derivatives, such as halogen, in particular chlorine-substituted styrene, alkyl and aryl, in particular lower alkyl, phenyl, and phenyl (lower) alkyl-substituted styrene and vinyl derivatives of naphthalene may be used in admixture with styrene. Specific examples of such styrene derivatives include the methyl styrenes such as alpha-methyl styrene, vinyl toluene, p-chlorostyrene, phenyl styrenes, vinylnaphthalene, chlorovinylnaphthalene, etc. As is known in the art, the amount of the styrene derivatives which is optionally used in admixture with styrene may vary within wide limits. In the following text such materials are collectively referred to as "styrenic compound".

The polymeric matrix may also be a copolymer of a styrenic compound and an ethylenically unsaturated monomer copolymerizable with the styrenic compound. Suitably, copolymerizable monomers are acrylic compounds, such as acrylonitrile, methacrylonitrile, mixtures of acrylonitrile and methacrylonitrile, alkyl, preferably lower alkyl, esters of acrylic and methacrylic acid, e.g. alkyl methacrylate and mixtures of acrylonitrile or methacrylonitrile with alkylmethacrylate.

According to a preferred embodiment of the invention, the polymeric matrix comprises a copolymer of a styrenic compound and acrylo- and/or methacrylonitrile.

The amounts of styrenic compounds and acrylic compounds within the polymer matrix may vary within wide limits, depending on the type of acrylic compound which is used, and on the desired properties of the copolymer. Accordingly, the amount of styrenic compound is at least 10%, by weight, based on the copolymer, but may reach 100%, by weight. The styrenic compound-acrylic compound copolymer may be prepared either in a continuous mass-polymerization or by suspension polymerization of the monomer mixture.

The copolymer of styrenic and acrylic compounds forming the polymeric matrix may also be prepared in the presence of a low amount of another copolymerizable monomer such as butadiene or of a rubbery polymer such as polybutadiene, this amount generally not exceeding 8%, by weight, based on the weight of the starting monomers.

A rubbery polymer chain, formed in situ, is then partly grafted onto the polymeric matrix. This rubbery polymer chain may result from any monomer being capable of forming a rubbery polymer by polymerization.

According to the present invention, said monomer is usually an ester of acrylic acid. Various esters of acrylic acid may be used in the process according to the present invention, but aliphatic alkyl esters, wherein the alkyl is straight or branched contains from 1 to about 12, in particular from 2 to about 12 carbon atoms, are preferred. Specific examples of such alkyl radicals are ethyl, propyl, butyl, 2-ethylhexyl.

Within the process of the invention, an acrylic acid ester alone or a mixture of esters of acrylic acid may be used, or else a mixture of an aliphatic alkyl ester of methacrylic acid, wherein the alkyl is striaght or branched and contains from 1, or preferably 2, to about 18, in particular from 1 to 2 to about 16, carbon atoms with at least one ester of acrylic acid, may also be used. A typical example of a methacrylic acid ester is decylmethacrylate.

The respective amounts of esters of acrylic acid and methacrylic acid are such that the resulting copolymer exhibits rubbery properties, that is, e.g., a $T_G$ temperature lower than 0° C.

In addition to the esters of acrylic acid a monomer mixture may include an amount of other copolymerizable monomers which does not cause any detrimental effect to the properties of the rubber. Such copolymerizable monomers are styrene, acrylonitrile, and methacrylonitrile.

In order to improve the impact strength of the final styrenic resin, the monomer mixture may further comprise monomers, which lead to cross-linking of the rubber formed in situ, in addition to the ester of acrylic acid. Such monomers which lead to a good cross-linking of the rubber may be vinyl alkylethers, diolefinic compounds, alkenyl acrylates or methacrylates, and diacrylates or dimethacrylates, e.g., of diol compounds. Specific examples of these monomers are isoprene, butadiene, chloroprene, ethylidene norbornene, vinyl methyl ether, allyl acrylate, allyl methacrylate, ethyleneglycoldiacrylate or -dimethacrylate, butanediol diacrylate or -dimethacrylate. Although all these monomers provide a satisfactory degree of cross-linking, butadiene and allyl methacrylate are preferably used because of economic reasons.

According to a preferred embodiment, the monomer mixture comprises at least one ester of acrylic acid and optionally methacrylic acid and a monomer containing two double bonds, e.g., a conjugated diolefin such as isoprene and/or butadiene.

The by-weight ratio between the ester of acrylic acid and said cross-linking monomers may vary between wide limits, depending on various factors, in particular on the desired degree of cross-linking. This ratio may reach a value as high as 1000/1. The optimum ratio depends on the chemical structure of the cross-linking monomers.

The polymerization of the monomers capable of forming rubbery copolymer, in the presence of the polymeric matrix, is performed with a suspension polymerization process which allows preparation of copolymer beads which are easily removed from the suspension mixture, and which are further easily washed and dried.

According to this process, the polymeric matrix is advantageously prepared by suspension polymerization. By this method, the resulting copolymer beads are kept in the suspension mixture which may be used directly in the process of the invention.

The process of the present invention may advantageously be carried out by slowly introducing the monomers which form the rubbery copolymer, into an aqueous suspension containing the polymeric matrix, a suspending agent and a surface-active agent. Examples of suspending agents are polyvinyl alcohol, polyvinyl pyrrolidone, hydroxyethyl cellulose, ammonium polyacrylate and mixtures thereof. Inorganic suspending agents which are insoluble and are therefore easily and completely removed from the styrenic resins are also advantageously used. Suitable inorganic suspending agents are $Al_2O_3$, ZnO, magnesium silicate and phosphates such as tricalcium phosphate.

The amount of suspending agent may be as low as about 0.1%, by weight, relative to the amount of water, and an amount higher than about 5 wt. % does not improve the results.

Suitable surface-active agents are the anionic surface-active agents such as fatty acid surfactants, aromatic carboxylic acid surfactants, aromatic and aliphatic organic sulfates or sulfonates such as sodium dodecylbenzenesulfonate, the sodium salt of monosulfate of the condensation product of nonylphenol and ethylene oxide, and the like. The anionic surfactants are ordinarily used in an amount corresponding from about 0.005 to about 1.0 wt. %, based on water.

This suspension mixture comprises from about 45 to about 90 wt. % of water and from about 55 to about 10 wt. % of an organic phase, comprising from about 5 to about 60 wt. %, preferably from about 15 to about 40 wt. % of the monomer mixture giving the rubbery copolymer and from about 95 to about 40 wt.%, preferably from about 85 to about 60 wt. % of the polymeric matrix. Furthermore, the latter may contain a residual amount of acrylonitrile and/or methacrylonitrile without creating any trouble for the process of the invention since this residual amount of acrylonitrile compound will be polymerized together with the other monomers giving the rubbery copolymer.

After addition of the monomers, the suspension mixture is stirred during a period of from about 1 to about 14 hours, in order to allow the absorption of the monomers by the polymeric matrix. This period of time depends mainly on the operating temperature in the range of between the room temperature and about 150° C. or suitably about 140° C., advantageously between about 60 and about 120° C. The total amount of monomers may be added before the start of the polymerization. Yet, if monomers favoring cross-linking are used, a part of these monomers may be added during the polymerization.

After the absorption period, the suspension polymerization is started.

This polymerization is performed in the presence of any free radical generating catalyst, preferably a peroxide, a perester or a perazo-compound, such as di-tert-butyl peroxide, tert-butyl perbenzoate, lauroyl peroxide, cumyl peroxide or hydroperoxide, azo-bis-isobutyronitrile or mixtures thereof. The amount of such catalysts may vary between about 0.02 and about 2.5 wt. %, preferably between about 0.05 and about 1.0 wt. %, based on the total weight of the monomers and the copolymer.

The reaction mixture may also contain other usual additives, such as lubricant, transfer agent, etc.

This polymerization is carried out at a temperature comprised between about 50 and about 150° C. Preferably, the polymerization is started at a temperature of between about 50 and about 125° C., and terminated at a temperature of between about 125 and about 150° C.

The polymerization is performed up to essentially complete conversion of the monomers. The resulting copolymer beads are removed from the suspension mixture, washed, centrifuged, and dried. Thereafter, the copolymer beads are extruded, generally in the presence of a phenolic antioxidant used in an amount of between about 0.05 and about 0.5 wt. %, based on copolymer, and optionally in the presence of a conventional plasticizing agent, such as an aliphatic alkyl ester of a fatty acid, a phthalate or the like.

It has been found that the process of the present invention allows improvement of the impact resistance of the rigid polystyrenic matrix. However, it is known that rubber is particularly effective as a modifier when the rubber is present during the polymerization of styrene. Grafting of some styrene to rubber takes place, and occlusion of polystyrene extends the volume fraction of the dispersed, reinforcing rubber phase. With the present process, a polystyrenic matrix is first produced, and thereafter the monomers capable of forming rubbery polymer are added to the polystyrenic matrix. In order to avoid the result that the added monomers form molecules which grow in the reaction mixture and only remain in admixture with the polystyrenic matrix, the suspension mixture must be agitated in order to allow the absorption of these monomers by the matrix. In the resulting rubber-modified polystyrenic composition, the rubber formed in situ is highly dispersed in the continuous polystyrenic phase. Practically no occlusion can be observed. Moreover, the composition is practically gel-free. By contrast, in rubber-modified polystyrenic resins prepared by a two-step process comprising a mass prepolymerization of styrene in the presence of a rubber followed by a suspension polymerization, the rubber particles are not so highly dispersed as in the products prepared by the present invention, and moreover, the rubber particles contain occluded polystyrene.

Figure 2:
FIG. 2 is an electron-microscope photograph of a rubber-modified polystyrene prepared by graft polymerization.
Figure 3:
FIG. 3 is an electron-microscope photograph of a rubber-modified polystyrene prepared by dry blending.

In order to illustrate the difference in internal structure of the ASA polymers of the present invention compared to prior art rubber-modified polystyrenic resins, reference is made to FIGS. 1–3 which were obtained by electronic-microscope. The photographs all have the same degree of enlargement.

FIG. 1 shows the internal structure of an ASA resin obtained in accordance with the process of the present invention. It can be seen that the rubber formed in situ, represented by the black spots, is highly dispersed in the continuous polystyrenic phase. Moreover, no occlusion can be observed (no white spots inside the black spots). The total rubber content of the ASA resin is 30% by weight.

FIG. 2 shows the internal structure of a rubber-modified polystyrene resin obtained in accordance with a usual graft polymerization process. The rubber particles are not so highly dispersed as in the process according to the invention, and moreover, it can be seen that the rubber particles contain occluded polystyrene (presence of small white spots inside the black spots). The total rubber content in the resin is 6% by weight.

FIG. 3 shows the internal structure of a rubber-modified polystyrene resin obtained in accordance with a mechanical blending process. Although the dispersion of the rubber particles appears to be good, the sizes of the rubber particles differ greatly from one another. The total rubber content of the resin is 10% by weight.

As above-stated, it is one important objective of the present invention to produce rubbery polymer-reinforced polystyrenic resin compositions which are substantially gel-free. In general, this means that the compositions should be substantially free of visible gel particles, i.e., rubbery polymer particles having a size greater than about 20μ. However, the ASA polymers according to the invention possess optimum properties when the means rubbery polymer particle size is decreased below 20μ, for example, preferably below about 10μ, more preferably below about 5μ and even more preferably below about 1μ. ASA polymers having excellent properties, such as impact strength, gloss, falling dart, tensile strength and elongation, are produced according to the invention when the rubbery polymer particles have a mean size between about 0.1 and 0.5μ, especially between about 0.1 and 0.2μ. Such ASA polymeers have especially good gloss characteristics.

Another important factor contributing to the enhanced properties of the ASA polymers according to the invention is the degree of homogeneity of the rubber polymer particles within the styrenic polymer matrix. Optimum properties are achieved when the rubbery polymer particles are uniformly distributed throughout the styrenic polymer matrix on a microscopic frame of reference.

Appropriate rubber polymer particle size as well as the degree of homogeneity of such particles are achieved as a result of appropriately carrying out the monomer absorption step according to the process of the present invention. The absorption of the rubbery monomer by the styrenic polymer matrix is dependent upon several factors, some of the more important of which are the temperature, the absorption time and the solubility of the monomer in the polymer matrix. Therefore, it is not possible to place precise limitations upon the parameters of the absorption step. More important are the results or objectives which are sought to be achieved.

Two of these objectives have been discussed above, i.e., rubbery polymer particle size and degree of homogeneity of the rubbery polymer particles throughout the styrenic polymer matrix. Related to the latter is the further objective of avoiding formation of a layer of rubbery polymer around the surface of the styrenic polymer beads in the suspension. These objectives are in turn directly related to achieving the desired properties of the final polymer product.

It is one objective according to the process of the invention to polymerize the rubbery monomer *only* within the beads or droplets of styrenic polymer in the suspension system, and as stated above, the rubbery monomer should be uniformly distributed throughout these beads or droplets. Thus, the absorption step must be carried out under non-polymerizing conditions for a period of time sufficient to enable the initially added rubbery monomer to be uniformly absorbed by the polymer matrix, and this period of time will be longer or shorter depending upon other factors, such as the temperature (higher temperature favors faster absorption) and solubility of the monomer in the polymer (obviously the greater the solubility, the shorter the time). If soluble in the polymer matrix, it is possible for the rubbery monomer to become completely dissolved in the polymer matrix, i.e., on a molecular level. Once this level of absorption is achieved, or for that matter, any other maximum or equilibrium degree of absorption, obviously any longer period of absorption becomes superfluous.

Because the free-radical polymerization catalyst is preferentially soluble in the polymer beads or droplets, polymerization of the rubbery monomer is confined to the polymer rather than the aqueous phase. This makes it possible to subsequently add rubbery monomer to the suspension system without production in the aqueous phase of separate particles of rubber polymer, which would show up as gel in the final product.

The ASA polymer compositions according to the present invention differ chemically from the usual graft copolymer compositions, such as high impact polystyrene and ABS polymers. In the latter, a styrenic monomer is polymerized in the presence of a rubbery material which contains double bonds. These double bonds provide grafting sites, and a high percentage of styrenic polymer chains are chemically grafted onto the rubbery polymer chains. Similarly, in the preparation of sequentially produced graft copolymers, reactive sites are also necessary to achieve the desired grafting. On the contrary, in the ASA polymers of this invention, it is the rubbery monomer which is polymerized in the presence of a pre-formed styrenic polymer, and because the rubbery monomer is free radical polymerized, there are essentially no reactive sites present. This means that only very little grafting takes place between the rubbery and rigid components.

The following examples are given in order to better illustrate the present invention but without limiting it.

EXAMPLE 1

15,600 g of water and 1,277 g of hydroxyapatite are introduced into a reactor which is equipped with a stirrer and a heating device.

An additional 30,770 g of water are added to this mixture. Thereafter, 27,600 g of a styreneacrylonitrile copolymer (73% styrene-27% acrylonitrile) are suspended in this mixture.

Then, 260 g of an aqueous solution containing 2.5% by weight of the sodium salt of dodecylbenzenesulfonic acid are added.

At this time, the total amount of butyl acrylate monomer and 25% of the butadiene monomer are simultaneously added under stirring at respective rates of 1.764 l/hr and 0.317 l/hr during a period of 6 hours and of 3 hours respectively, at a temperature of 60° C.

The complete absorption of the monomers by the copolymer is effected at a temperature of 60° C. within a period of 12 hours.

After this period of time, 23.7 g of tertbutyl perbenzoate are added as catalyst and the suspension mixture is heated to a temperature of 112° C., and this temperature is maintained for a period of 4 hours.

During these 4 hours, the rest of the butadiene monomer is added at a rate of 0.714 l/hr.

Thereafter, 39.4 g of a 40% dicumyl peroxide solution are added and the suspension mixture is heated to a temperature of 130° C., which temperature is maintained for a period of 2 hours.

Then, 79 g of a 40% dicumyl peroxide solution are added and subsequently the suspension mixture is then heated to a temperature of 135° C. for an additional period of 3 hours.

When polymerization is complete, the copolymer beads are washed, centrifuged and dried, and thereafter the styrene-acrylonitrile-butyl acrylate-butadiene copolymer is extruded in the presence of 0.15% by weight, relative to the copolymer of 2.6 ditert-butyl-4-methyl phenol as an anti-oxidant and in the presence of 3% by weight relative to the copolymer of butyl stearate as a plasticizing agent.

The extruded copolymer has the following properties: p0 Melt flow index: 2.93 g/10' (at 10 kg)
Vicat: 92.5° C.
Izod impact strength: 2.51 ft lb/inch
Falling dart: 140 inch-lb
Tensile strength at yield: 4670 psi
Elongation: 106%
Gloss: 90%

EXAMPLE 2

A suspension mixture is prepared as described in Example 1, but by simultaneously adding, while stirring, the total amount of ethylhexyl acrylate monomer and 25% of the butadiene monomer at respective rates of 1.556 l/hr during a period of 6 hours and of 0.317 l/hr during a period of 4 hours 30 minutes at a temperature of 60° C.

The complete absorption of the monomers by the copolymer is effected at a temperature of 60° C. during a period of 12 hours.

After this period of time, 23.7 g of tert-butyl perbenzoate are added as catalyst, and the suspension mixture is heated to a temperature of 102° C., and this temperature is maintained during a period of 8 hours.

During this period of 8 hours, the rest of the butadiene monomer is added at a rate of 0.536 l/hr.

Thereafter, the procedure described in Example 1 is repeated, except that the resulting coplymer is extruded in the presence of 0.2% by weight relative to the copolymer of 2.2' methylene-bis-(4-ethyl-6-tert butylphenol) as antioxidant.

The extruded copolymer has the following properties:
Melt flow index: 0.92 g/10' (at 5 kg)
Vicat: 95° C.
Izod impact strength: 3.79 ft. lb/inch
Falling Dart: 145 inch-lb
Tensile strength at yield: 4005 psi
Elongation: 24%
Gloss: 89%

EXAMPLE 3

15,600 g of water and 1,379 g of hydroxyapatite are introduced into a reactor which is equipped with a stirrer and a heating device.

An additional 30,700 g of water are added to this mixture. Thereafter 19,700 g of a styreneacrylonitrile copolymer (73% styrene-27% acrylonitrile) are suspended in this mixture.

Then, 289 g of an aqueous solution containing 2.5% by weight of the sodium salt of dodecylbenzenesulfonic acid are added.

At this time, the total amount of ethylhexyl acrylate monomer and 25% of the butadiene monomer are simultaneously added under stirring at respective rates of 2.591 l/hr during a period of 6 hours and of 0.529 l/hr during a period of 4 hours 30 minutes at a temperature of 60° C.

The complete absorption of the monomers by the copolymer is effected at a temperature of 60° C. during a period of 12 hours.

After this period of time, 29.55 g of tertbutyl perbenzoate are added as catalyst and the suspension mixture is heated to a temperature of 102° C., and this temperature is maintained during a period of 8 hours.

During this period of 8 hours, the rest of the butadiene monomer is added at a rate of 0.892 l/hr.

After a reaction period of 4 hours, 9.85 g of tert butyl perbenzoate are added simultaneously with the butadiene monomer.

Thereafter, 39.4 g of a 40% solution of dicumyl peroxide are added and the suspension mixture is heated to a temperature of 130° C., which is maintained for a period of 2 hours.

Then, 79 g of a 40% solution of dicumyl peroxide are added and subsequently the suspension mixture is heated to 135° C. for an additional period of 3 hours.

When polymerization is complete, the copolymer beads are washed, centrifuged and dried. Finally, the copolymer beads are blended with a styrene-acrylonitrile copolymer (73% styrene-27% acrylonitrile) in order to obtain an ASA resin having a rubber content of 30%.

The resulting ASA resin was thereafter extruded in the presence of 0.2% by weight, relative to the copolymer of 2.2' methylene-bis-(4-ethyl-6-tert butyl phenol) as antioxidant.

The extruded copolymer has the following properties:
Melt flow index: 1.68 g/10' (at 10 kg)
Vicat: 83° C.
Izod impact strength: 6.10 ft lb/inch
Falling Dart: 48 inch-lb
Tensile strength at yield: 3468 psi
Elongation: 23%
Gloss: 87%

EXAMPLE 4 15,600 g of water and 1,277 g of hydroxyapatite are introduced into a reactor which is equipped with a stirrer and a heating device.

An additional 30,700 g of water are added to this mixture. Thereafter, 27,600 g of an ABS resin having a polybutadiene content of 6% are added (68.6% styrene-25.4% acrylonitrile).

Then, 260 g of an aqueous solution containing 2.5% by weight of the sodium salt of dodecylbenzenesulfonic acid are added.

At this time, the total amount of butyl acrylate monomer and 25% of the butadiene monomer are simultaneously added under stirring at respective rates of 1.235 l/hr during a period of 6 hours and of 0.254 l/hr during a period of 4 hours 30 minutes at a temperature of 60° C.

The complete absorption of the monomers by the copolymer is effected at a temperature of 60° C. during a period of 12 hours.

After this period of time, 19.0 g of tert-butyl perbenzoate are added as catalyst and the suspension mixture is heated to a temperature of 102° C., and this temperature is maintained for a period of 8 hours.

During this period of 8 hours, the rest of the butadiene monomer is added at a rate of 0.4285 l/hr.

Thereafter, 37.1 g of a 40% solution of dicumyl peroxide are added and the suspension mixture is heated to a temperature of 130° C., and this temperature is maintained for a period of 2 hours.

Then, 79 g of a 40% solution of dicumyl peroxide are added and subsequently the suspension mixture is heated to 135° C. for an additional period of 3 hours.

When the polymerization is complete, the copolymer beads are washed, centrifuged and dried.

The resulting ASA resin is extruded in the presence of 0.15% by weight, relative to the weight of copolymer of 2.6 di-tert-butyl-4-methyl phenol as antioxidant.

The extruded product has the following properties:
Melt flow index: 0.97 g/10' (at 10 kg)
Vicat: 92.6° C.
Izod impact strength: 2.79 ft lb/inch
Falling Dart: >160 inch-lb
Tensile strength at yield: 3615 psi
Elongation: 40%
Gloss: 82.5%.

EXAMPLE 5

15,600 g of water and 1,279 g of hydroxyapatite are introduced into a reactor which is equipped with a stirrer and a heating device.

An additional 30,700 g of water are added to this mixture. Thereafter, 27,600 g of a styrene-methylmethacrylate copolymer (43.7% methylmethacrylate-56.3% styrene) are suspended in this mixture.

Then, 260 g of an aqueous solution containing 2.5% by weight of the sodium salt of dodecylbenzenesulfonic acid are added.

At this time, butyl acrylate monomer and allyl methacrylate monomer are simultaneously added under stirring at a rate of 6.620 l/hr during a period of 2 hours at a temperature of 120° C.

The amount of allyl methacrylate monomer represents 0.5% by weight of the monomers.

After the addition of the monomers, the mixture is cooled to a temperture of 112° C., 23.7 g of tert-butyl perbenzoate are injected as catalyst, and the suspension mixture is maintained at a temperature of 112° C. for a period of 4 hours.

Thereafter, 39.4 g of a 40% solution of dicumyl peroxide are added, the suspension mixture is heated to a temperature of 130° C., and this temperature is maintained during a period of 2 hours.

Then, 79 g of a 40% solution of dicumyl peroxide is added, and the suspension mixture is heated to 135° C. for an additional period of 3 hours.

When the polymerization is complete, the copolymer beads are washed, centrifuged and dried, and thereafter the styrene-methylmethacrylate-butyl acrylate-allyl methacrylate copolymer is extruded in the presence of 0.2% by weight, relative to the copolymer of 2.2'methylene-bis-(4-ethyl-6-tert-butyl-phenol) as antioxidant and 0.07% by weight relative to the copolymer of zinc stearate.

The extruded copolymer has the following properties:
Vicat: 96° C.
Izod impact strength: 0.76 ft lb/inch
Falling Dart: 40 inch-lb
Tensile strength at yield: 4960 psi
Elongation: 50%

EXAMPLE 6 (COMPARATIVE)

The procedure of Example 1 is repeated, except that the absorption step is carried out for only a period of 20 minutes. In comparison to the properties of the product obtained in Example 1, this product has the following properties:
Gloss: 57%
Falling Dart: 84 inch-lb.

What is claimed is:

1. A process for preparing a substantially gel-free, rubbery polymer-reinforced styrenic resin, which comprises the steps of:
   (a) adding a monomer material selected from the group consisting of acrylic acid esters, mixtures of acrylic acid esters, and mixtures of an alkyl ester of methacrylic acid with at least one acrylic acid ester to an aqueous suspension comprising a suspending agent, a surface-active agent, and beads of a rigid polymeric matrix substantially free of reactive sites comprising a polymer of a styrenic compound;
   (b) contacting the polymeric matrix and the monomer material under agitation conditions in which said monomer is absorbed by the polymeric matrix, whereby there is formed an aqueous suspension of styrenic polymer beads having said monomer material substantially uniformly distributed therein;
   (c) subjecting said suspension formed in step (b) to suspension polymerization at a temperature ranging between about 50° and about 150° C. in the presence of a free radical generating catalyst to polymerize said monomer material within said beads, whereby there is formed a styrenic polymer reinforced by said polymerized monomer material which is partly grafted on the polymeric matrix.

2. The process as defined in claim 1, wherein the monomer which produces a rubbery polymer comprises an ester of acrylic acid.

3. The process as defined in claim 2, wherein the ester comprises an alkyl ester of acrylic acid, wherein the alkyl contains 1 to about 12 carbon atoms.

4. The process as defined in claim 3, wherein the ester is selected from the group consisting of ethyl acrylate, propyl acrylate, butyl acrylate, and 2-ethyl-hexyl acrylate.

5. The process as defined in claim 2, wherein the monomer material is a monomer mixture, comprising at least one acrylic acid ester and at least one monomer selected from the group of monomers which are copolymerizable with said acrylic acid ester and monomers which are capable of cross-linking the rubbery polymer.

6. The process as defined in claim 3, wherein said copolymerizable monomer is an alkyl ester of methacrylic acid wherein the alkyl comprises 1 to about 16 carbon atoms.

7. The process as defined in claim 6, wherein the alkyl ester of methacrylic acid is butylmethacrylate.

8. The process as defined in claim 5, wherein the copolymerizable monomer is selected from the group consisting of styrene, acrylonitrile and methacrylonitrile.

9. The process as defined in claim 5, wherein the copolymerizable monomer is used in such an amount that a copolymer with rubbery properties is formed.

10. The process as defined in claim 5, wherein the monomer capable of cross-linking the rubbery polymer comprises a monomer capable of cross-linking the rubbery polymer in situ.

11. The process as defined in claim 10, wherein the monomer capable of cross-linking the rubbery polymer in situ is selected from the group consisting of vinyl alkylethers, diolefinic compounds, alkenyl acrylates, alkenyl methacrylates, diacrylates, and dimethacrylates.

12. The process as defined in claim 11, wherein the monomer capable of cross-linking the rubbery polymer in situ comprises butadiene or allyl methacrylate.

13. The process as defined in claim 1, wherein the styrenic compound within the polymer matrix is styrene.

14. The process as defined in claim 1, wherein the polymer matrix comprises a copolymer of a mixture comprising styrene and at least one styrenic compound from the group consisting of halogen-substituted styrenes, alkyl-substituted styrenes, aryl-substituted styrenes, and vinyl derivatives of naphthalene.

15. The process as defined in claim 1, wherein the polymer matrix comprises a copolymer of a mixture comprising at least one styrenic compound and at least one acrylic compound.

16. The process as defined in claim 15, wherein the acrylic compound within the polymeric matrix is selected from the group consisting of acrylonitrile, methacrylonitrile, mixtures of acrylonitrile and methacrylonitrile, alkyl methacrylate and mixtures of acrylonitrile or methacrylonitrile with alkyl methacrylate.

17. The process as defined in claim 1, wherein the polymeric matrix comprises a styrene homopolymer.

18. The process as defined in claim 15, wherein the polymeric matrix comprises a copolymer comprising 10-99% by weight of a styrenic compound and 90-1% by weight of an acrylic compound.

19. The process as defined in claim 15, wherein the copolymer is a styrenic compound-acrylonitrile copolymer.

20. The process as defined in claim 19, further comprising the step of preparing said polymer matrix under suspension polymerization conditions and directly adding said monomer material to the suspended polymer matrix obtained from said suspension polymerization step.

21. The process as defined in claim 21, wherein said suspended polymer matrix comprises a residual amount of unpolymerized acrylonitrile compound which is subsequently polymerized together with said monomer material.

22. The process as defined in claim 19, wherein the monomer material comprises a compound containing two double bonds and an alkyl ester of an acid selected from the group consisting of acrylic acid, methacrylic acid and their mixtures.

23. The process as defined in claim 19, wherein the styrenic acrylonitrile copolymer is prepared in the presence of another copolymerizable monomer used in an amount not exceeding about 8% by weight.

24. The process as defined in claim 22, wherein the compound containing two double bonds is a conjugated diolefin.

25. The process as defined in claim 24, wherein the conjugated diolefin is butadiene or isoprene.

26. The process as defined in claim 22, wherein the by-weight ratio between the ester and the compound containing two double bonds is from about 90/1 and about 1/1.

27. The process as defined in claim 26, wherein said by-weight ratio is from about 9/1 to about 1/1.

28. The process as defined in claim 27, wherein said by-weight ratio is from about 4/1 to about 1/1.

29. A styrenic resin produced in accordance with the process as defined in claim 1.

30. The process as defined in claim 18, wherein the copolymer is prepared in the presence of a rubbery polymer used in an amount not exceeding about 8% by weight based on the starting monomers.

31. The process as defined in claim 30, wherein the rubbery polymer is polybutadiene.

32. The process as defined in claim 1, wherein the suspension comprises from about 45 to about 90% by weight of water and from about 55 to about 10% by weight of an organic phase comprising from about 5 to about 60 wt. % of the monomer material and from about 95 to about 40 wt. % of the polymeric matrix.

33. The process as defined in claim 32, wherein the organic phase comprises from about 15 to about 40% by weight of the monomer material and from about 85 to about 60 wt. % of the polymeric matrix.

34. The process as defined in claim 1, wherein the monomer material is contacted with the polymeric matrix during a period of from about 1 to about 14 hours at a temperature in the range of between room temperature and about 150° C.

35. The process as defined in claim 34, wherein the temperature is between about 60° and about 120° C.

36. The process as defined in claim 34, wherein the monomer material is a monomer mixture comprising a monomer which is capable of cross-linking the rubbery polymer in situ and wherein from about 20 to about 50% by weight of the monomer capable of cross-linking the rubbery polymer in situ are added simultaneously with the other monomer of the monomer mixture, and the remainder of the monomer capable of cross-linking the rubbery polymer in situ is added during the polymerization.

* * * * *